July 14, 1970 W. P. LEAR 3,520,460

MAGNETIC TAPE DRIVE SYSTEM

Filed April 25, 1967 6 Sheets-Sheet 1

INVENTOR
WILLIAM P. LEAR
BY
Richard A. Marsen
ATTORNEY

INVENTOR
WILLIAM P. LEAR

BY Richard A. Marsen
ATTORNEY

July 14, 1970 W. P. LEAR 3,520,460

MAGNETIC TAPE DRIVE SYSTEM

Filed April 25, 1967 6 Sheets-Sheet 3

INVENTOR
WILLIAM P. LEAR

BY Richard A. Marsen
ATTORNEY.

MAGNETIC TAPE DRIVE SYSTEM

Filed April 25, 1967 6 Sheets-Sheet 4

INVENTOR
WILLIAM P. LEAR

BY [signature]
ATTORNEY.

MAGNETIC TAPE DRIVE SYSTEM

INVENTOR
WILLIAM P. LEAR

BY Richard A. Marsa
ATTORNEY.

INVENTOR
WILLIAM P. LEAR
BY Richard A. Marsen
ATTORNEY.

3,520,460
MAGNETIC TAPE DRIVE SYSTEM
William P. Lear, Wichita, Kans., assignor to Lear Jet Corporation, Wichita, Kans., a corporation of Delaware
Continuation-in-part of application Ser. No. 540,289, Apr. 5, 1966. This application Apr. 25, 1967, Ser. No. 633,635
Int. Cl. B65h *17/20*
U.S. Cl. 226—188 4 Claims

ABSTRACT OF THE DISCLOSURE

A capstan motor drive for transporting magnetic tape in a player. The motor is at relatively slow speed to permit its capstan shaft to protrude and engage the tape against a roller. A concentric sleeve about the shaft contains its bearings and has a cut-out section for tape engagement with the capstan. Avoids need of deleterious belts or gearing; is a direct drive. Motor mounts directly between top and bottom of the player housing through its shaft, which permits compact construction. The outer motor shell contains the armature windings, which combines to serve as the drive flywheel.

This invention relates to player systems of magnetic tape records, and more particularly to efficient and effective drive systems therefor of inexpensive, compact and rugged construction. This patent is a continuation in part of my Pats. 3,329,845 and 3,364,369 and of application Ser. No. 540,289 of Apr. 5, 1966, which are assigned to the assignee hereof.

A number of significant and novel improvements in the player hereof, result in simpler construction and operation of its component sections, and also contribute to the inherent compactness of its overall bulk. Thus, the track-shifting mechanism includes a short magnetic head support tilted by a step-cam, and is readily adjusted in elevation and azimuth for precise tracking of the multi-track tape records. The drive motor is an inside-out arrangement, its outer shell being the rotor with a shaft as capstan for direct drive of the tape. The rotor is proportioned as a flywheel for smooth tape transport. The rotor is the only continually moving part in the player, eliminating the need for and space taken by belts, pulleys, gear and a separate flywheel.

The motor shaft extends to end bearings set in the base and cover of the player, and thereby permits a minimum vertical dimension therefor. The steady wear of belted tape drives is avoided, resulting in less service need and better quality of sound reproduction. Materially less wow and flutter are encountered in the player hereof than heretofore possible in mobile systems. Placing the pinch roller within the cartridge avoids the considerable vertical dimension requisite for chasis mounted swing-in type. Using transistors for the radio, motor control circuit, and stereo audio amplifiers in conjunction with the compact mechanical features hereof permits the construction of a combination radio-player unit that fits into the dashboard radio chassis module of current automobiles.

The above and further features, advantages and objects of this invention will become more apparent from the following description of an exemplary embodiment thereof, illustrated in the drawings, in which.

Figure 1:
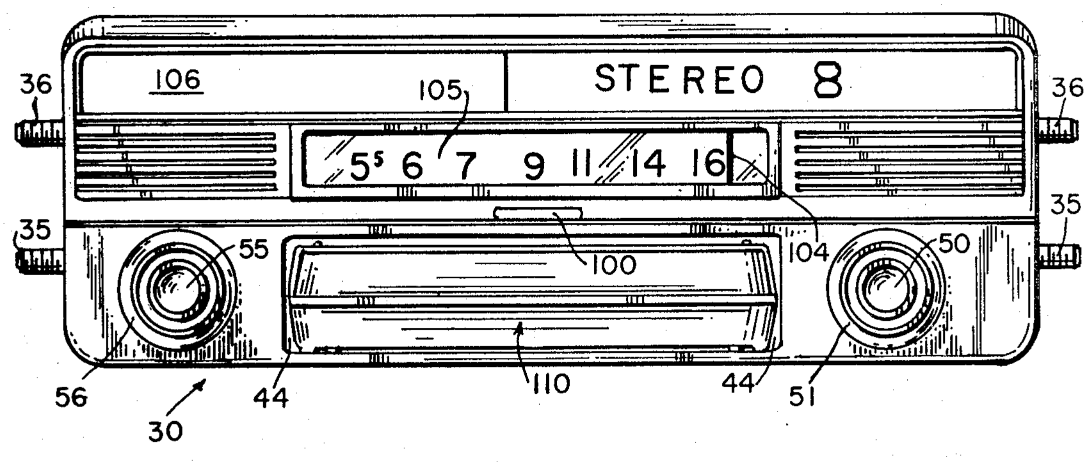
FIG. 1 is a front face view of the exemplary player, with a magnetic tape cartridge inserted therein.

The housing of the player 30 is composed of two half sections 31, 32 that are fastened together by machine screws or bolts at corner apertures 33, 33. The sections 30, 31 are preferably rugged castings to afford suitable rigidity and reference platforms for stably supporting the player motor and mechanism in their precision transport and tracking of the magnetic tape 51 in a cartridge 50 inserted for play. The castings 31, 32 may be of aluminum or magnesium alloy to conserve weight. Two pairs of threaded studs 35, 36 extend centrally out of the sides of the player sections 31, 32. The stud sets 35, 36 are for securing the assembled player 30 onto a bracket 37, for adjustably mounting it in play position in a vehicle.

The magnetic tape cartridge 50 is inserted in a slot or tunnel 44 therefor, extending into the player from its front. A radio tuner-detector unit 45 is incorporated with the exemplary player 30. It is transistorized and fitted in a longitudinal compartment 46 at the right side of partition 47 in base 31. The radio tuning of unit 45 is performed through shaft 48 that extends to front or central tuning knob 50. Circuitry for the radio tuner-detector, for clarity, is not shown, nor are those for the stereo amplifiers and motor control; the present invention not being concerned as to their details.

Figure 3:
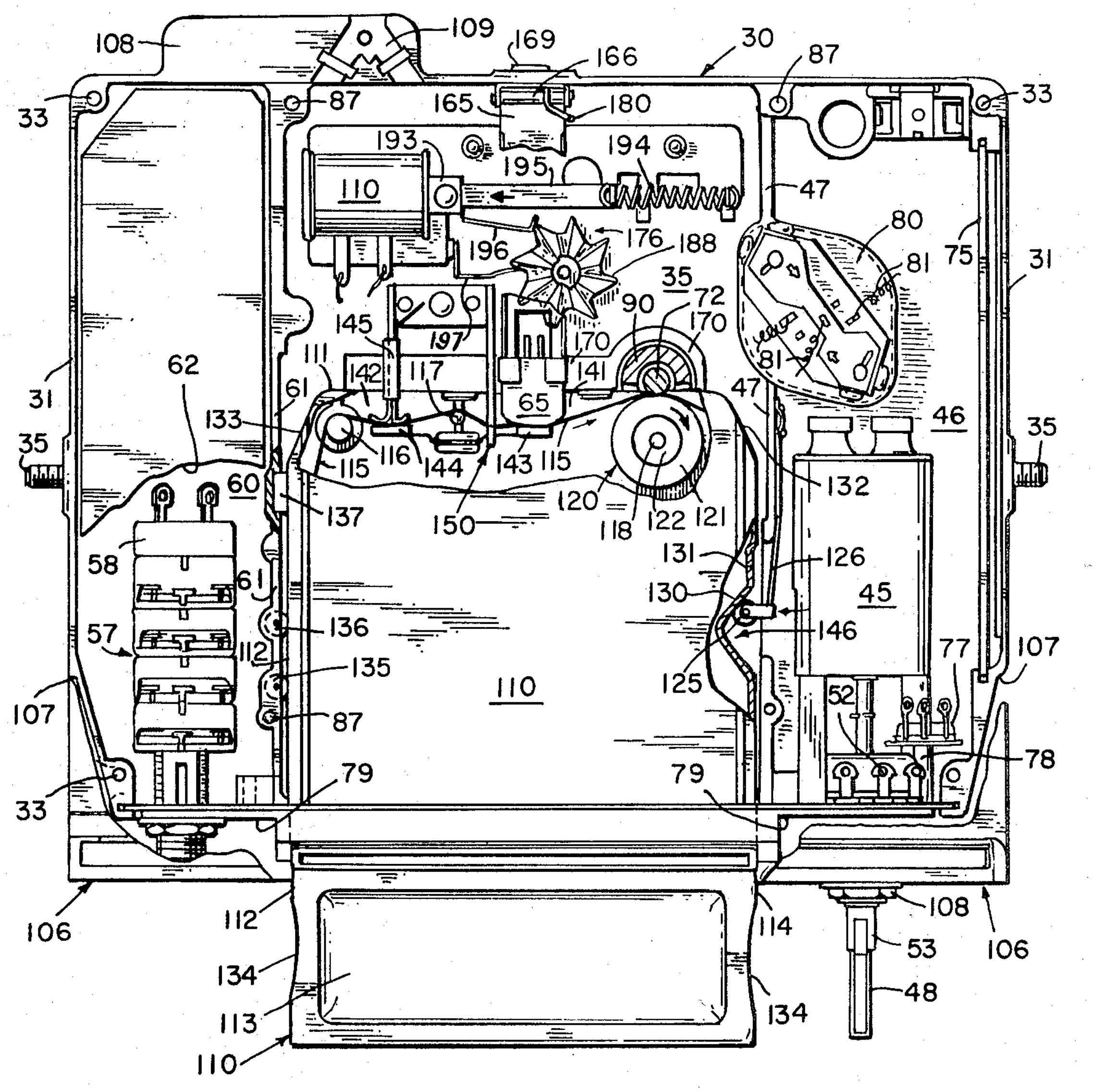
FIG. 3 is a plan view corresponding to FIG. 2 with the motor and other portions removed to show the interior mechanism and components, and their coaction with a cartridge inserted for tape play.

The balance control potentiometer 52 for stereophonic sound output control has a concentric sleeve 53 that is secured with the outer or back knob 51 (see FIG. 3). Such knob array is of course optional. Clockwise rotation of knob 51 increases the right sound channel output while decreasing that on the left. Counterclockwise rotation will produce the opposite effect.

The set of control knobs 55, 56 at the left side are used herein as follows: The front or central knob 55 functions as the overall radio/player on-off switch, and volume setting. The outer or back knob 56 couples to a pair of potentiometers that effect tone control on both the stereo amplifier channels. This permits one to select the most pleasing tonal range for both the radio and tape playing. When it is turned clockwise the tone is more treble or brilliant. Turning knob 56 counterclockwise makes the tone more mellow and accentuates the bass tones.

A four-section potentiometer 57 (see FIG. 3) is used for the volume and tone control, in tandem for both stereo amplifiers. These are suitably ganged to the shaft and sleeve for control knobs 55, 56. At its rear section is the on-off electrical switch 58, above referred to. The exemplary dual stereo amplifier is a transistorized printed circuit array that is fitted within the longitudinal compartment 60 with ganged control 57, 58, at the left side of chassis base 31. Compartment 60 is defined by the left wall of base 31 and an interior wall 61 (see FIGS. 3 and 18). The compact stereo amplifier pair includes preamplification for the low-level magnetic head signal pickup of the tape record, and is diagrammatically indicated by its backboard 62 for simplicity of illustration.

The exemplary tape drive motor 70 is a low-voltage low-speed direct current permanent magnet type. Its rotor 71 is external and contains the predominate mass thereof to serve as a flywheel. Its central drive shaft 72 is the capstan for direct contact with and transport of the magnetic tape, see FIGS. 3, 18 and 19. The precise motor speed in r.p.m. is automatically controlled by an electronic motor control circuit energized by the vehicle low voltage source, as a twelve volt storage battery. Further description of the exemplary motor 70 is presented hereinafter in connection with FIGS. 18 and 19.

Details of a direct current motor (as 70) are described in said Pat. 3,364,369 for "Electric Motor Construction." A suitable practical motor control system is set forth in Pat. 3,396,323 of Samuel H. Auld for "Electronic Motor Speed Control." It is to be understood that other drive systems may be used in the basic player hereof, as for example an alternating current motor, as for home-use models with an available 60 cycle source.

Most of the motor control circuit is readily assembled on a compact printed-circuit-board, indicated at 75 (FIG. 3). Such board is held vertically along the right side of the player, by insertion in slots 76, 76 provided in base 31. A small potentiometer 77 has a forward projecting shaft 78 accessible through a small aperture in the front panel 79 for adjusting the speed of motor 70. The sizeable power transistor that directly controls the current through the motor is mounted in a well 80 formed in the bottom of base 31 into the region 46, as seen in FIG. 3. This transistor (not shown) is mounted on the outside of base 31 for better ventilation, and suitably secured against the metal surface of well 80 that serves as a heat sink for circuital stability. Leads 81, 81 extend from the control transistor terminals into compartment 46 for connection in the circuit.

The motor control circuit regulates the motor speed to the predetermined r.p.m. for transporting the magnetic tape longitudinally past head 65, e.g. at 3.75 inches per second. Such motor speed is normally held substantially uniform over wide variation in ambient temperature or available battery voltage. Should the motor speed somehow be off noticeably, a stroboscopic pattern premarked on its flat top can directly ascertain this. Slight adjustment of the potentiometer 77, performed simply from the player front, is generally sufficient to synchronize the motor pattern, and its speed.

A central sub-chassis 85, as a stiff steel plate, is secured to base 31 by self-tapping screws 86, 86 into apertures 87, 87. Plate 85 mounts the stator 88 of motor 70 with screws 89, 89, see FIGS. 18 and 19. A sleeve 90 is secured to the center of stator 88 and extends to a "Teflon" pad 91 in a well 92 formed just below the level of base 31. A cut-out 93 in sleeve 90 provides access for the tape to the surface-roughened capstan thereat.

The motor 70 as a whole, including sleeve 90 and shaft 72, is thus mounted as a simple sub-assembly with a chassis plate 85. Its placement in the player is direct, sleeve 90 fitted into well 92 and the four screws 86, 86 securing plate 85 in proper position on base 31. This reduces production cost and service time. Its simplicity of parts and placement reduces cost and improves quality of the reproduced sound, with minimum wow and flutter and minimum wear and tear.

Circuit components are readily fitted on chassis plate 85. However, the vertically low motor 70, of relatively high diameter, takes up the predominate portion of the volume available above plate 85 and a large part of the space over compartment 46. The low-and-wide cylindrical configuration of rotor 71 enhances its rotational moment of inertia for a given power rating for the motor 70 and weight.

These inertia factors hereof provide excellent stabilyzing flywheel action requisite for high quality sound reproduction of tape records. The motor drive and flywheel action and capstan operation at precise rotational speed, are all provided by a single flat moving part, namely rotor 71 with its central shaft 72. Ultimate compactness in volume with minimum player height are thereby provided by the present invention. Further details of the simplicity of the exemplary motor mounting in the player, directly between base and cover 31, 32, are described hereinafter in connection with FIGS. 18 and 19. Such compactness is important for players that are to fit behind shallow dashboards, or in other confined locations.

Figure 2:
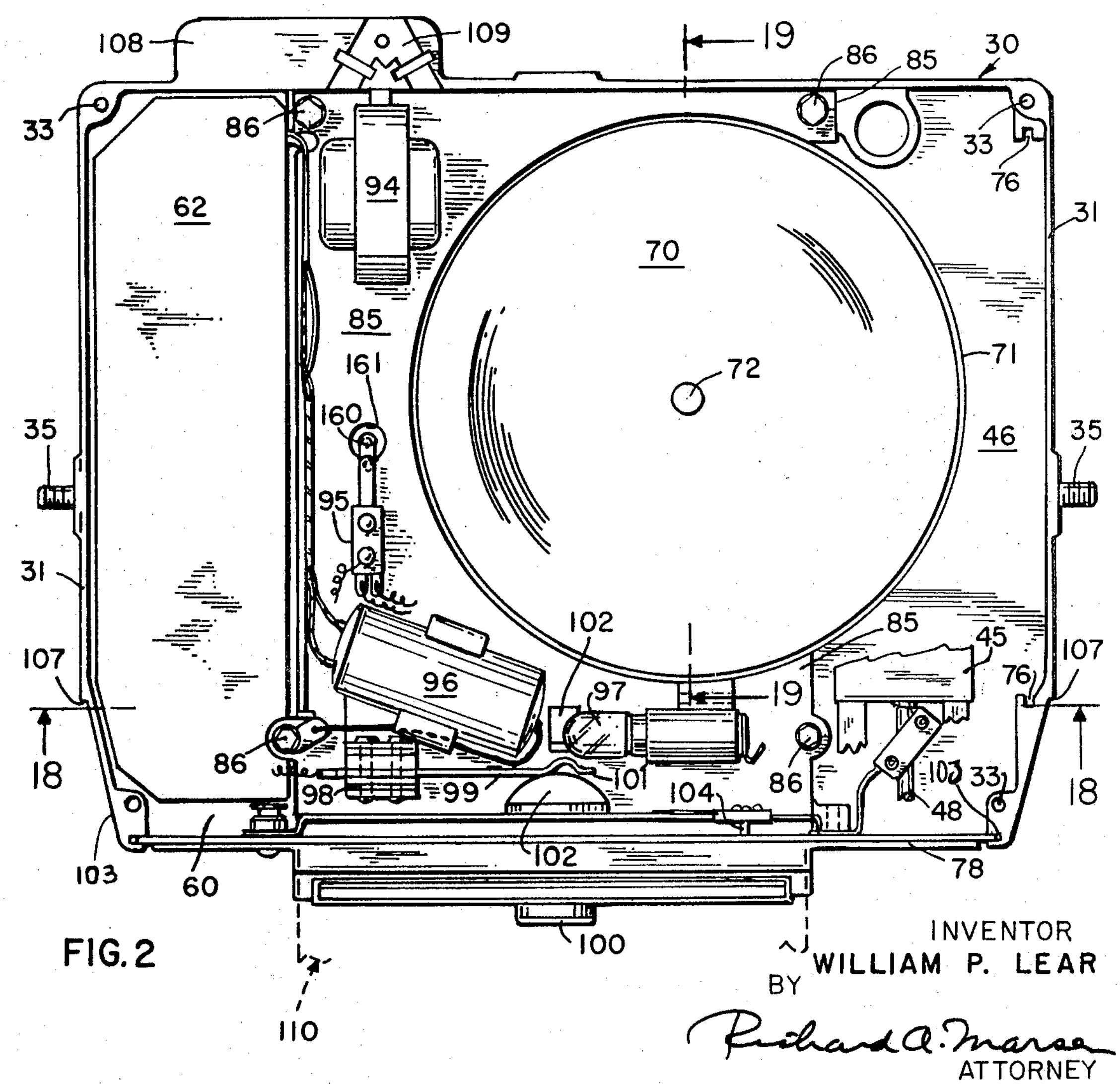
FIG. 2 is a plan view of the lower player section, with the upper section removed; the wiring being omitted for clarity.

Motor plate 85 carries thereon circuit transformer 94, cartridge operated radio/tape play-mode switch 95, electrolytic condenser 96, pilot light 97, and program or tape-track selector switch 98. The function and operation of play-mode select switch 95 is set forth hereinafter in connection with FIG. 3A. The program-select switch 98 comprises a leaf spring 99 that coacts with a push-button 100 slideably mounted centrally in front panel 78. The tip 101 of leaf spring 99 is arranged to normally press against the rear 102 of button 100 (FIG. 2). When the button is pressed inwardly, manually, tip 101 is displaced to contact grounded lug 102. A circuit is thereupon completed that energizes solenoid 110, to in turn effect the shifting of pick-up head 65 to the next stereo track pair or program position on the tape record.

The front panel 78 is a self contained sub-assembly that is inserted in vertical slots at the front corners 103, 103 of base 31, and companion ones in cover 32. When a radio tuner 45 is included in the player, a radio dial 105 is used. A movable pointer 104 is mechanically coupled to radio tuning shaft 48 controlled by knob 50 (not shown). Dial 105 is linear, parallel to cartridge tunnel 44, and placed above the tape cartridge position in the player. In this way one can view the radio tuning operation while a cartridge remains in player 30 in the "radio-play" position to be described.

A decorative front-cover or bezel 106 is readily combined with the player hereof. Its purpose is to enhance the appearance of the player, or permit ready change of design as viewed from the front. Bezel 106 may be inexpensively molded of tough plastic material, and coated with a metallic film to constitute a shiny player front. It is made to harmonize with the knobs.

Openings are provided to expose radio dial 105 and cartridge tunnel 44. An opening is also provided for the program select button 100 to project through, and an aperture for access to the motor speed control shaft 78. The bezel is hollow and proportioned to fit against vertical recesses 107, 107 in the side walls of base 31 and cover 32. The player sides are toed-in or tapered from recesses 107, 107. Bezel 106 is mounted against the player front by its having holes that fit over the front control shafts and sleeves when the knobs 50, 51 and 55, 56 are removed. The control shaft lock-nuts, or the knobs themselves, are positioned against bezel 106, holding it in position on the player at grooves or recesses 107, 107.

The exemplary cartridge 110 contains a reel of magnetic tape 115 therein, in endless array. A loop of the tape extends adjacent the forward end 111 thereof: about corner guide post 116, intermediate guide post 117, and pinch roller 120. The pinch roller hereof is rotatably supported on a fixed stud or post 118 of the cartridge housing, and contains a tire 121 of suitable elastic material as silicone, rubber or the like, concentric on its hub 122. More detailed description of cartridges similar to the one 110 hereof are set forth in the copending patent applications Ser. No. 467,599 "Endless Tape Cartridge," and my Pat. 3,403,868 for "Magnetic Tape Cartridge System," assigned to the same assignee.

Tape cartridge 110 is inserted into player 30 at frontal slot or tunnel 44. FIG. 3 illustrates the cartridge fully inserted and firmly and stably held in the tape-play position. A retention roller 125 is arranged at the right side of the tunnel, biased inwardly towards the cartridge position by leaf spring 126, as indicated by the adjacent arrow. Roller 125 is held firmly pressed against an inclined wall 130 in the side of cartridge 110. The angle and location of wall 130 is arranged to establish a force component that presses pinch roller 120 against capstan 72 as well as a force component pressing the opposite cartridge side 112 firmly against side rollers 135, 136 and projecting member 137.

Rollers 135, 136 are mounted on respective vertical axes in partition wall 61; member 137 being affixed with wall 61. The rollers 135, 136 are preferably of solid self-lubricating material as "Teflon," "nylon," "Delrin." They materially facilitate the insertion and removal of the cartridge from the close fitting tunnel 44, and coact to stably hold the cartridge in a "floating" condition for smooth tape play in conjunction with the engaged retention roller 125 on inclined wall 130.

Proper pressure is established and maintained between the pinch roller 120 and capstan 72 for even and firm longitudinal transport of the magnetic tape therebetween. The capstan 72 and pinch roller 120 automatically align and adjust for optimum operation therefor in the novel effective floating arrangement hereof. Irregularities among cartridges as to true "squareness" or warpage, tire 121 resiliency or wear, are directly resolved in efficient tape play. No unpredictable friction on the cartridge sides is encountered which otherwise could constrain it into unsatisfactory tape presented for play at head 65.

When cartridge 110 is fully inserted in the play mode shown in FIG. 3, it is engaged with capstan 72 as hereinabove described. The capstan presses on the tape 115 as exposed through a front opening 140 at pinch roller 120. A further opening 141 admits pick-up head 65 to coact with the transported tape 115. A pressure pad 143 maintains the tape against the surface of head 65. A tape guide 150 mounted in the player adjacent head 65 is arranged to hold the tape firmly in a predetermined plane for head 65, and at a set level for precise tracking. Details of the exemplary tape guide 150 and its operation herein are set forth hereinafter in connection with FIGS. 15, 16 and 16A.

Another opening 142 at the cartridge front permits the insertion of sensing contactor 145 to establish continuous contact with the passing tape 115. Pressure pad 144 facilitates this. Two individual curved contact arms detect the passage of a conductive strip adhered to the endless tape at its record end/start position. A circuit is thereby closed to energize solenoid 110 and initiate the shift of head 65 to the next successive track playing position on tape 115 in the manner to be described hereinafter in connection with FIGS. 4 through 12.

Figure 3A:
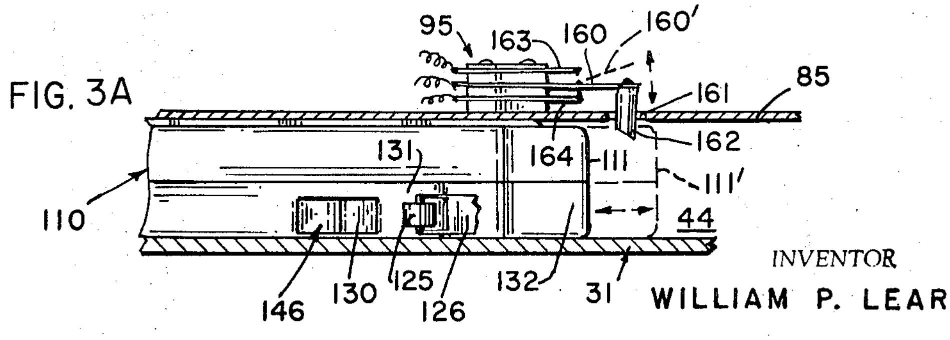
FIG. 3A is a diagrammatic illustration of the cartridge operated tape/radio play switch arrangement herein.
Figure 4:
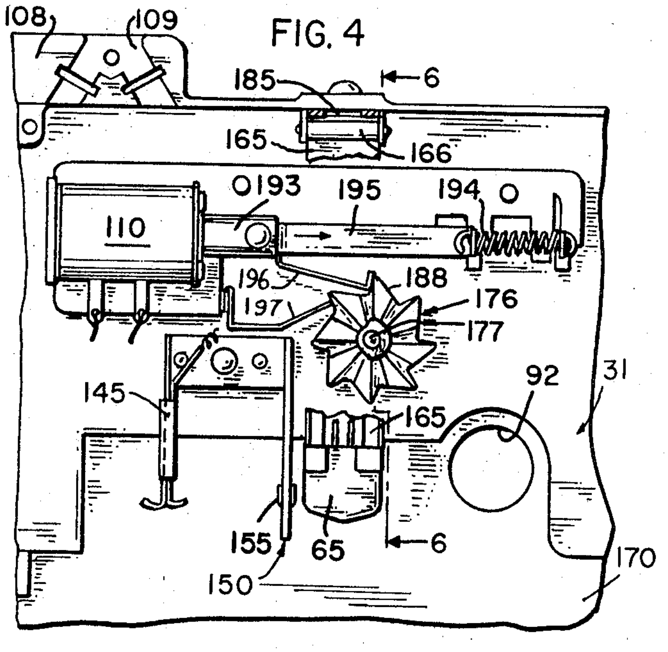
FIG. 4 is a plan view of the track shift mechanism upon completion of a shift actuation; partially broken away.

Upon the full insertion of the cartridge in the player, as shown in FIG. 3, the speed control circuit 74 for the drive motor 70 is directly activated to energize and operate the motor and its integral capstan 72. Towards this end, cartridge operated switch 95 is actuated, and the contained tape 115 is promptly transported for play by the capstan action. Switch 95, mounted above tunnel 44 on sub-chassis plate 85, has its central leaf-spring 160 extend over an aperture 161 in plate 85. A nonconducting pin 162 is fastened to the tip of leaf 160, and projects through the aperture into tunnel 44, as seen in FIG. 3A.

When cartridge 110 is fully seated, in forward abutment with capstan 72, its front end 111 is at the dashed line position 111′. Pin 162, which preferably has a slanted face, is thereupon moved upwardly by the cartridge. This results in leaf-spring 160 connecting with upper contact 163, in dash-line position 160′. This corresponds to the illustrated connection of switch **95*a* in tape-play mode FIG. 24. As set forth hereinafter, the motor control circuit 74 and motor 70 remain energized and operative-for-play while the play mode switch is thus closed by the tape-play position of the cartridge. It is of course understood that the master switch 58 is "on" through operation of knob 55 for either tape or radio to "play" under the control of cartridge actuated switch 95 (or 95*a***).

When it is desired to change to radio-play the cartridge is withdrawn from the full-in tape-play mode by say ⅜″ or ½″. This action frees switch pin 162, which thereupon permits leaf-spring 160 to return to its normally closed position on lower contact 164. The contacts 160–163 are thereupon opened, the motor control circuit de-energized, and the motor 70 stopped. Closure of contacts 160–164 completes the circuit energizing radio tuner and detector unit. In the radio-play position of cartridge 110 detent roller 125 may repose in the shallow depression or secondary notch 131, further up side 114 nearer to ramp 132, or the cartridge fully withdrawn. Such cartridge operated selective radio/tape play system corresponds to that first described in Pat. No. 3,400,227 for "Combined Radio and Magnetic Tape Player," and assigned to the assignee hereof.

Figure 15:
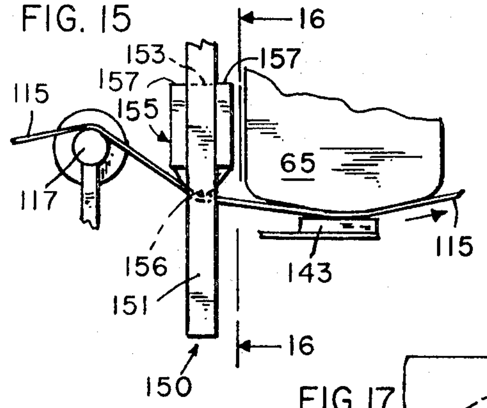
FIG. 15 is a plan view of the tape guide system hereof.
Figure 16:
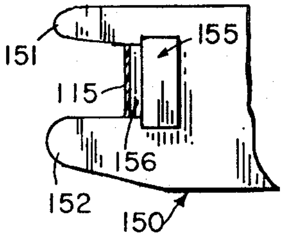
FIG. 16 being an elevational view thereof as seen along the line 16—16, and FIG. 16A a much enlarged perspective view of the insert used therein.

It is to be noted that the rigidly constructed base section 41 serves as a platform for the inserted cartridge 110. The bottom or base of the cartridge lies flat on firm player section 31 as seen in FIG. 3A. Further, the tape guide 150 projects into the opening 141 at the front of the cartridge and accepts the linear passing tape 115 as seen in FIGS. 3, 15 and 16. The guide fingers 151, 152 project across the tape and maintain it parallel to the front surface of head 65 for precise tracking coaction therewith. Tape 115 closely fits between the inner surfaces of fingers 151, 152 and against guide member 155 as will be set forth in greater detail.

Figure 6:
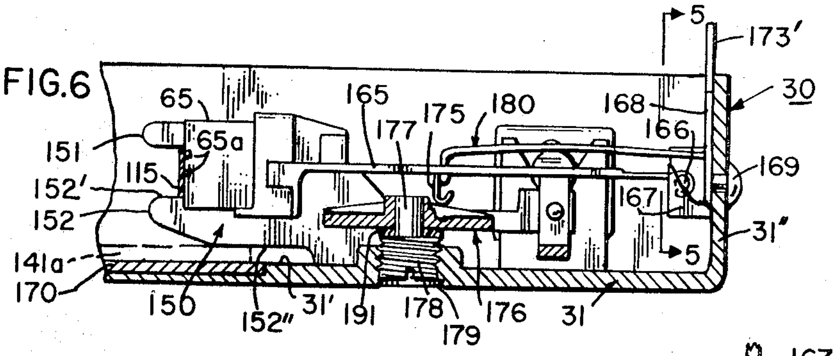
FIG. 6 is an enlarged side elevational view of the head support and track shift mechanism, as seen along the line 6—6 of FIG. 4 in the direction of the arrows.

Importantly, tape 115 is held substantially perpendicular to the base 31 and at a predetermined distance with respect thereto, for the duration of tape play. This is due to the tape's coaction in guide 150, and the preset distance maintained therefor between the tape surface 152′ of finger 152 and the inner surface 31′ of base 31, as best seen in FIG. 6. Further, for play stability despite significant warpage of the cartridge housing, lower lip **141*a* of the cartridge at front opening 141 is gripped by tape guide 150 at the undersurface 152″ of finger 152**. The thus firmly held cartridge and precisely fed tape thereof in the player contributes to a minimum wow and flutter in playback by the system hereof.

The player hereof is very well adapted and constructed to play tape records containing eight parallel individual recorded sound tracks on one-quarter inch wide tape. Such tracks each are of the order of 0.020″ wide and necessarily closely spaced to fit on such tape width. The head is supported for play by the track positioning and shifting mechanism hereof for repetitive precision tracking and reproducing of the magnetically recorded sound. The two pick-up regions 65*a* of head 65 are spaced apart for stereo play whereby track numbers 1 and 5, 2 and 6, 3 and 7, 4 and 8 are paired for this purpose.

The tape record end/start region is sensed by contactor 145 as aforesaid, to directly actuate the track shifting operation to maintain continuity of play among the successive track pairs. For monaural eight-track recording, each parallel track is scanned and played in succession, as in the manner effected automatically in the copending patent application "Selective Stereo-Monaural Player," Ser. No. 522,514, filed Jan. 24, 1966, and assigned to the same assignee. A cartridge 110 4.0" x 5.5" x ⅞" in overall dimensions can readily contain a 400 foot reel of conventional lubricated ¼" magnetic tape for this purpose. Played at 3.75" per second, this produces a stereo program one hour and twenty minutes long; and a monaural one of two hours and forty minutes. Such endless tape cartridges may be constructed as referred to hereinabove.

The tape tracking and shift mechanism hereof is a simplified and more effective construction than shown and described for this purpose in Pat. No. 3,437,762, assigned to the assignee hereof. Its function is to present pick-up head 65 at precisely the correct on-track orientation with respect to the prepositioned tape passage, and then to rapidly shift the head to the next successive track position in response to a shift signal. As already stated and as circuitally set forth in the just mentioned patent, each time the program select button 100 is pressed and/or each time the end/start conductive tape patch reaches contactor 145, solenoid 110 is energized for a short duration. Its armature is thereupon displaced to effect a predetermined lateral displacement of head 65 on the passing tape 115.

Figure 5:
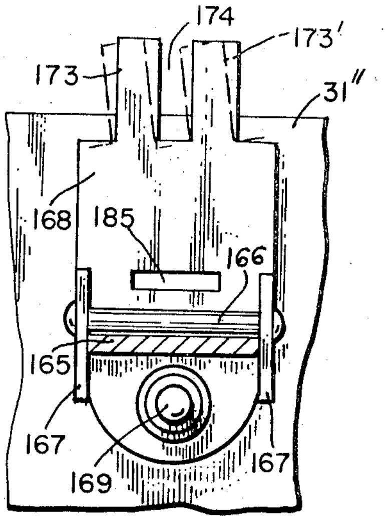
FIG. 5 is an enlarged elevational view of the angular adjustment section of the head support member, as seen along the line 5—5 of FIG. 6.

Head 65 is solidly attached to the end of a support beam 165. Support 165 is pivotally mounted to an upright edge 31" of base 31 through pin 166 carried in the arms 167, 167 of a bracket 168. Bracket 168 is pivotally secured to the base section 31" by a rivet 169. The angular orientation or azimuth of head 65 with respect to the path of the recorded tape tracks is thus readily and directly adjustable through angular positioning of bracket 168 firmly retained by rivet 169 against section 31." Towards this end two spaced tongues 173, 173' extend from bracket 168 to above the level of lower chassis 31, as best seen in FIGS. 5 and 6. A flat tool inserted in the slot 174 between tongues 173, 173', as the end of a screwdriver is used for the azimuth adjustment. While factory set and stable, azimuth readjustment is indicated if there occurs a noticeable loss in the high frequency portion of the sound played back. Such adjustment is readily made herein while the player is in operation, with the top cover removed.

Head support 165 contains a depending leg 175 that is spring biased against the surface of step cam 176 and serves as a cam follower. In the exemplary system step cam 176 has four discrete levels, and coacts with follower 175 to angularly displace head 65 as will be described in more detail in connection with FIGS. 10, 11 and 12. Each cam level corresponds to the level of a track pair that is prerecorded on the tapes. Each successive cam step displaces follower 175 and head 65 accordingly for progressive playing of the tape records. The steps of cam 176 are in circular array and arranged to cyclically repeat their successive head shifting action.

Cam 176 has a central opening that mounts rotatably about a post 177 that extends up from base 31, see FIG. 6. Post 177 is an end part of a wider threaded member 178 that serves as a set-screw. Set-screw 178 is set in an internally threaded opening 179 in the bottom of base section 31. Its position in opening 179 determines the distance of cam 176 from base 31. Such adjustment is readily performed with precision. A screwdriver serves to turn set-screw 178 in or outwardly. The normal range of positions of set-screw 178 is preferably with its head fully within opening 179, so as not to project from base 31. Sealing wax applied as a thin layer over the set-screw from the outside affords advantageous stability to its setting, made externally.

Misadjustment of the height of head 65 above the reference level of the chassis base interior 31', or with respect to the tape level as determined by the tape guide 150 as aforesaid, results in deterioration of the quality of sound reproduction and/or cross-talk. Slow turning of set-screw 178 raises or lowers cam follower 175 correspondingly, and in turn changes the elevation setting of the head in its angular shifting by bracket 165. Cross-talk is noticeable in stereo play when interference from other tracks occurs during pauses in the particular tracks in play. The invention adjustment arrangement hereof is inexpensive, simple, effective and stable.

It is important to maintain a firm steady pressure of cam follower 175 on step cam 176. In this way the tracking is maintained uniformly, despite bumpy riding in portable useage, or non-horizontal player orientation. A simple compound integral spring 180 is used to maintain a strong spring force or bias between cam follower 175 and cam 176.

Figure 7:
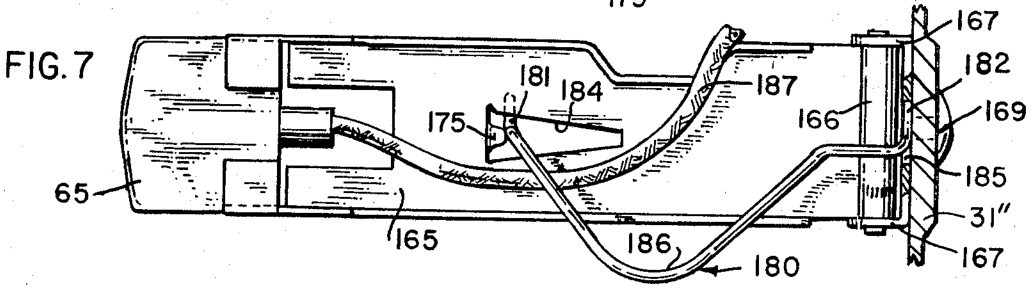
FIG. 7 is an enlarged plan view of the head support assembly.
Figure 8:
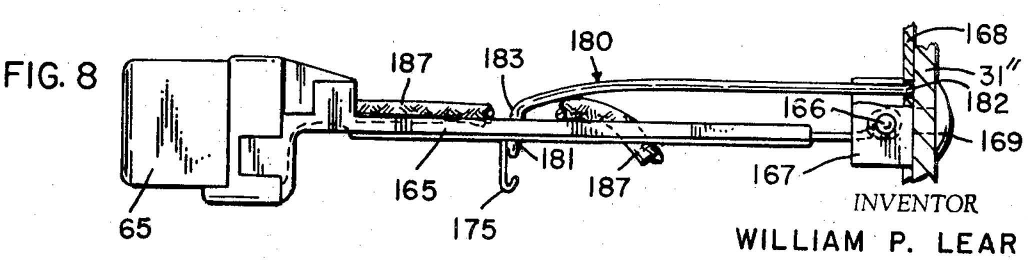
FIG. 8 is a side elevational view of the head support assembly of FIG. 7, partially broken away.
Figures 9, 9A:
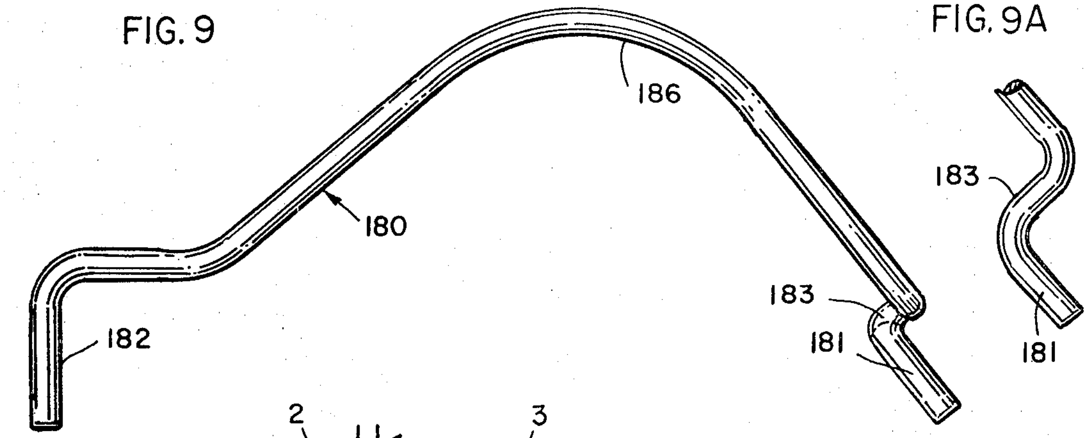
FIG. 9 is an enlarged plan view of the snap spring for the head support assembly.
FIG. 9A being a further view of a tip thereof.

Exemplary spring 180 is made of stainless steel wire, 0.054" in diameter. It extends about 1.5" between its ends 181, 182 when held in position, as shown in FIGS. 6, 7 and 8. Its lower end 181 is in the form of a hook 183 that engages in a slot 184 of support 165. Slot 184 is adjacent cam follower leg 175, and in fact is formed by punching out leg 175 thereat. The opposite spring end 182 is formed to be parallel to base section 31" and is latched into a matched rectangular groove or slot 185 in bracket 168. The central portion 186 of spring 180 is arcuate. FIGS. 9 and 9A are enlarged views of spring 180 in unmounted condition.

The far end 182 of spring 180 is above the level of head support 165, while end 181 is at the bracket level. The spring is bowed at its arcuate center 186, contracting it to readily and simply snap in between slots 184 and 185, see FIG. 7. Several important functions are accomplished thereby. Firstly, the requisite force component between the cam follower 175 and cam 176 is directly provided. Such force of the order of 75 grams, is exemplary. Secondly, a longitudinal force component occurs on support 165, in the direction outwardly, away from its hinge 166, 167. The head support 165 is thereby held tautly, eliminating any looseness of fit or functioning. Thirdly, the shaping of spring 180 and its orientation serves to hold the leads or cable 187 from head 65 dressed properly on support 165. This saves some labor, material, as it is accomplished upon insertion of the spring.

Figure 10:
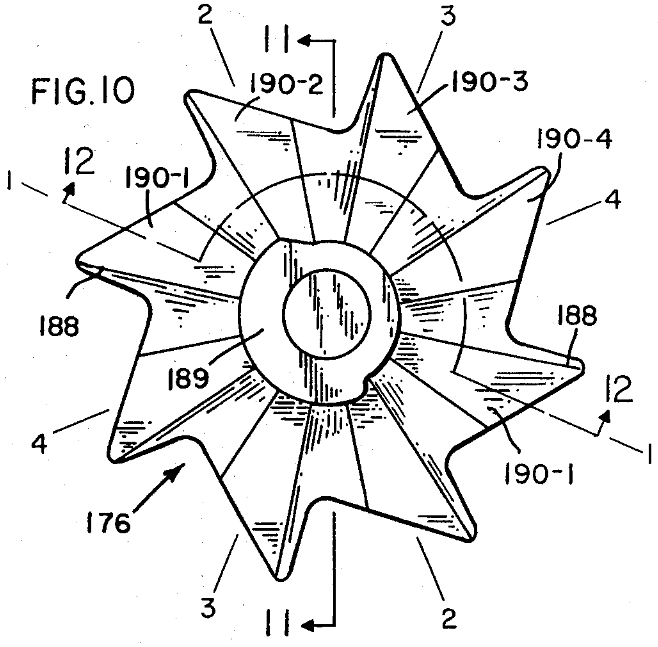
FIG. 10 is an enlarged plan view of the step cam of the track shift mechanism.
Figure 11:
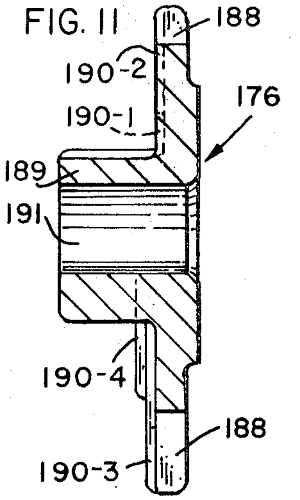
FIG. 11 is a cross-section taken through the cam of FIG. 10, along line 11—11 thereof.
Figure 12:
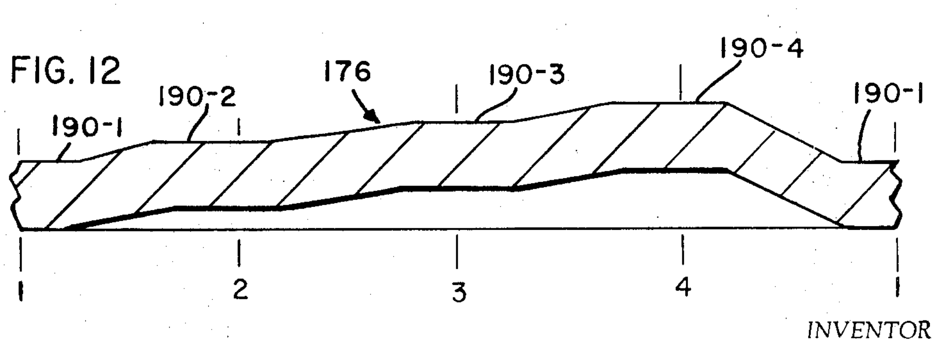
FIG. 12 is a diagram of the FIG. 10 cam as developed along the compound line 12—12 thereof.

Step cam 176 contains two cycles or sets of levels, each cycle being four discrete steps. Cam 176 contains integral peripheral ratchet teeth 188, 188, eight in number herein. Each cam shift or step thus subtends a 45° turn. FIGS. 10, 11 and 12 are enlarged informative views of step cam 176. The numerals 1, 2, 3, 4 refer to the respective sequential steps or levels of the cam as it is rotated in 45° increments, through two cycles per one revolution. As denoted in development FIG. 12, each step 190–1, 190–2, 190–3 and 190–4 is flat and parallel to the base under the cam, namely the bottom 31' of base section 31.

Cam 176 is fabricated of powdered iron, to precise dimensions. A central stereo-monaural cam 189 is molded integrally with step cam 176 for purposes set forth in the aforesaid patent application Ser. No. 522,514. Cam 176 has its central aperture 191 fit onto post 177, and a washer 192 as of "nylon" is placed between it and set-screw 178. Ratchet-cam 176 is actuated step-by-step, in 45° amounts upon each electrical energization of solenoid 110. Its plunger 193 is attached to return spring 194 by link arm 195. A trip spring 196 attached to plunger 193 engages ratchet teeth 188 in succession, to turn cam 176 one step clock-wise upon the return motion of the plunger 193. Pawl 197 and spring 196 serve to hold ratchet-cam 176 stably in its angular position between actuations, see FIG. 4.

Despite precise orientation of the head 65 through elevation and azimuth adjustments with respect to the tape record tracks, other mechanical factors may result in mistracking or cross-talk during playback. Such factors are mechanical inaccuracies in the chassis casting 31 or in tape guide 150 per se, poor capstan 72 verticality or parallelism with the pinch roller 120. Another important factor is found to be due to the angular displacement of the head 65 by its support 165 in the track shifting operation.

Figure 13:
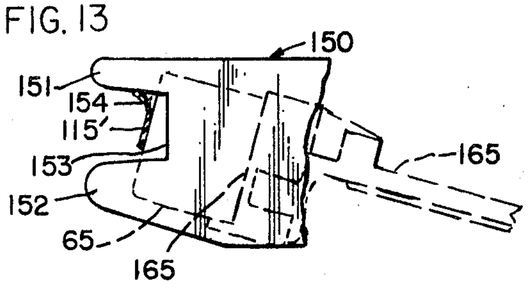
FIGS. 13 and 14 are diagrammatic prior art showings of a fault in magnetic tape handling that is overcome herein.
Figure 14:
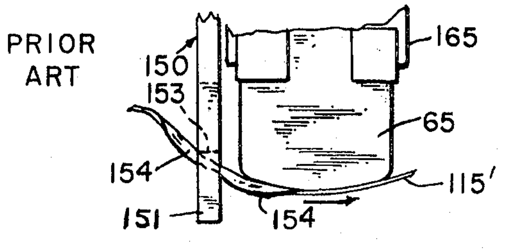

The head is in effect pivoted at hinge 166, 167, and thus its tape face is angularly displaced with respect to the normal tape path. The result is shown in FIGS. 13 and 14, in exaggerated illustration. The path of tape 115' is nominally parallel to the inner surface 153 between fingers 151, 152. However, magnetic tape is a very thin material, with a base as of "Mylar"; is limber, limp, with no inherent stiffness. The tape is readily collapsed in the transverse direction. Actually, tape 115' in FIGS. 13, 14 is shown curled at its upper region 154. This often occurred in prior players due to the angular track shifting of head 65 as stated, or the other factors referred to to upset the tape from its normal play path. The limber tape 115' could rather readily move up or down from its nominal path, and ride across part of finger 151 or 152 as illustrated, with a curled end. Such tape displacement correspondingly shifted the preset tape track levels for the scanning, and thereby produced cross-talk.

Significant stiffening of the tape 115 is provided in proper orientation, at the tape guide 150 and close to the head 65, as set forth in the copending patent application Ser. No. 599,156 of Samuel H. Auld for "Magnetic Tape Guide Means," assigned to the assignee hereof. The tape stiffening is produced by imparting a marked radius to the tape in its movement towards the head. A smooth, tough member 155, preferably of self-lubricating material is mounted in the tape guide 150. Suitable material is "Delrin" or "Teflon." Member 155 contains a projection or nose 156 that is oriented parallel to the desired tape path and over which the tape 115 is arranged to pass in close contact.

The radius of the tip of nose 156 of exemplary member 155, as used for ¼" magnetic tape of limp base material a few thousandths of an inch thick, has been found very satisfactory at 0.010". This radius extends for its whole height, along the order of ¼" to match the tape height; its thickness being 0.060". It is noted that the position of member 155 is such as to direct the tape to wrap considerably about its nose 156 and thereby impart a marked radius on the tape that significantly stiffens it at that section.

Figure 16A:
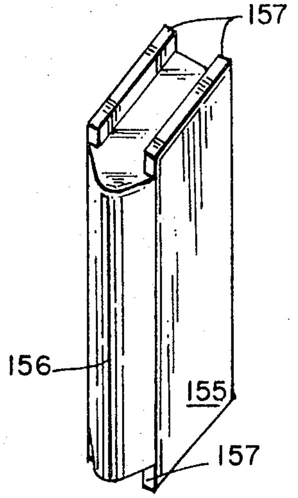
Figure 17:
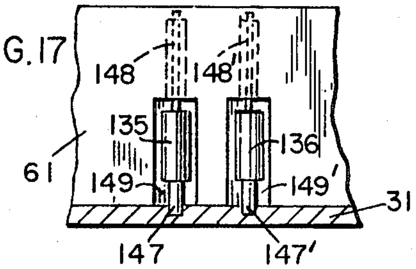
FIG. 17 is an enlarged elevational view of the side rollers in the player that facilitate coaction of the magnetic tape cartridge with the player.

The result is an elimination of cross-talk, whether due to angular scanning by head 65, or the irregularities referred to hereinabove. No curling or tape displacement can occur. The tape 115 maintains a strong and rigid plane unto its scanning coaction with the head 65. The exemplary member 155 is molded in the form of an insert for the tape guide 150. FIG. 16A is an enlarged perspective showing thereof. Two sets of ribs 157, 157 extends therefrom to grip onto respective fingers 151, 152. Its back surface merely abuts guide surface 153. Its depth, as 0.110", thus projects nose 156 beyond further into the cartridge opening and thereby effect the significant radius of curvature to the tape 115 that stiffens it thereat.

Figure 18:
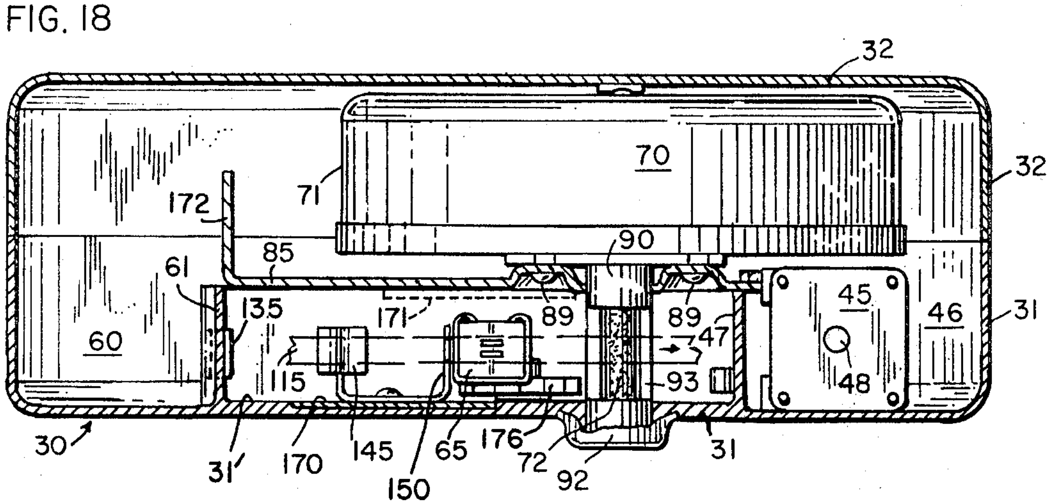
FIG. 18 is a cross-sectional view taken through the player along the line 18—18 of FIG. 2, showing the simplified motor-capstan arrangement thereof and its relation to the magnetic tape and associated player components.

Cross-sectional FIG. 18 shows the normal tape path 115 in elevation, across head 65, capstan 72, tape guide 150 and contactor 145, all operative at a predetermined distance from reference surface 31' of base section 31. The pickup head 65 is a low signal level device, constructed with a shell that is an effective shield against surrounding magnetic and electric disturbances. Nevertheless it is advantageous to further shield against often strong extraneous radiations that emanate from automobile ignition systems and/or the motor 70 drive.

A plate 170 of magnetic shielding material, of "Permalloy," "Mu-metal" or the like, is set in a groove in base 31 under the tape handling and pickup section of the player, see FIG. 18. Another such plate 171 is fastened below sub-chassis 85 in the region above said sensitive pickup section. Also a wall 172 extends upwardly from metallic sub-chassis 85 in the vicinity of the high-gain stereo amplifiers that are placed in compartment 60. Ledge 172 and wall 61 shield compartment 60.

Figure 19:
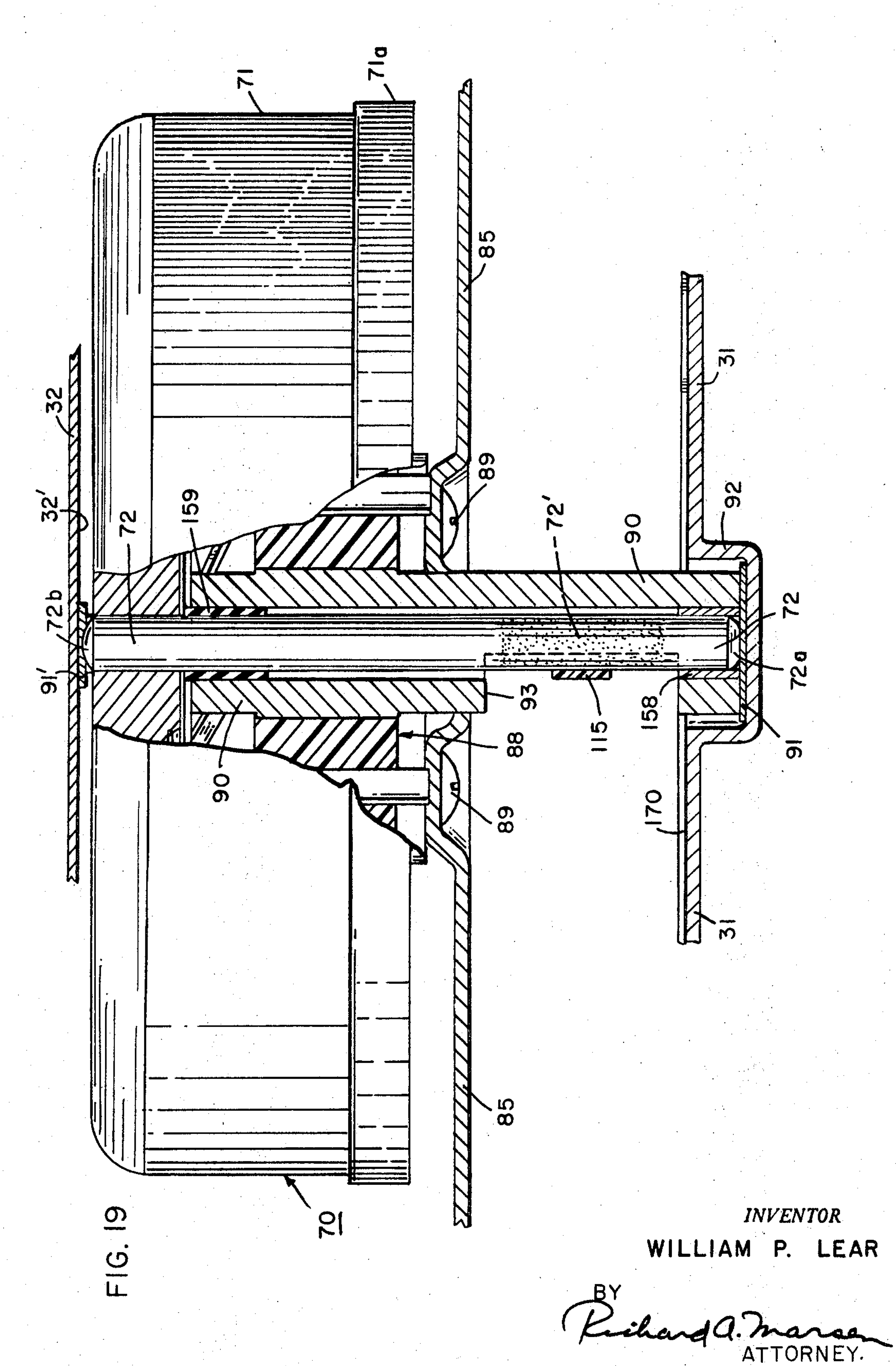
FIG. 19 is an enlarged elevational view of the drive motor-capstan, partly in cross-section, taken along the line 19—19 in FIG. 2, also showing its mounting arrangement in the player.

The drive motor 70 has its central stator 88, see FIG. 19, fastened to sub-chassis 85 by suitable screws 89, 89. Stator 88 contains peripheral permanent magnet sectors (not shown) that coact with the rotor 71 concentric thereabout. The rotor 71 is capped by a lid 71a that serves as a bottom shield. The stator 88 contains central sleeve 90 in which the motor capstan/shaft 72 mounts. Two sleeve bearings 158, 159 are used therein. Shaft 72 is secured with the rotor shell. In practice, the relatively lightweight stator-sleeve unit 88, 90 remains mounted in its position on sub-chassis 85.

During factory assembly or field service the sub-chassis 85 assembly is readily handled as a separate section of the player. Electrical connections to components thereon are either made long or with clip-in ends. It is inserted in position by simply placing the foot of sleeve 90 into well 92 when plate 85 is secured on base 31 by screws 86, 86 (FIG. 2) resulting in a solid precise bearing arrangement for the motor shaft 72. Details of the construction and operation of motor 70 are set forth in the Pat. 3,364,369 referred to hereinabove.

The motor mounting is further stabilized by the provision of a thrust bearing surface in well 92 at pad 91, and importantly by a top pad 91' also of self-lubricating material as "nylon" or "Teflon." Both the bottom and top ends 72a, 72b of motor shaft 72 are formed with a smooth rounded surface. The distance between the inside bottom surface of well 92 and the inside surface 32' of cover section 32 is predetermined and rendered consistent and firm. This is due to the solid rigid construction of the player half-sections 31, 32 that are precisely fitted together.

The resilient pads 91, 91', of proper thickness, are affixed in place on sections 31, 32 and constitute a simple, effective, inexpensive and unique rotary support for the rotor 71. Sleeve bearings 158, 159 and sleeve 90 serve primarily to align and hold shaft 72 in its intended vertical position; while preset resilient end bearings insure stable rotation thereat without axial displacement. Pad 91' may desirably have its central portion cupped to receive shaft end 72b, for further centering and alignment upon assembly.

The single-moving-part rotor/capstan 71, 72 concept herein is further enhanced by the extreme mechanical simplicity and stability of the tape drive assembly hereof. The exemplary compact player 30, with cover sections 31, 32 of substantial strength and thickness, a rotor 71 of substantial weight for significant flywheel action, and all the electronic circuitry weighs the order of only nine pounds.

The present invention has been set forth in connection with an exemplary embodiment that has been proven to be practical in the manner described through wide use in mobile tape players.

What is claimed is:

1. Capstan drive means for transporting the magnetic tape of a playback apparatus comprising an electric motor having a central shaft extending therefrom with a projecting portion thereof constituting the tape capstan, bearing means rotatably supporting said shaft, a rotor secured for rotation with said shaft, a stator mounted about said shaft and concentrically disposed with said rotor, said rotor being proportioned to provide a direct flywheel action on the capstan shaft secured therewith whereby said tape capstan longitudinally transports the magnetic tape in the apparatus at substantially uniform velocity, a central sleeve contained by said stator that surrounds said shaft, said sleeve extending beyond the stator and having an opening at an intermediate portion through which a tape may be presented to the shaft for linear transport by the adjacent surface of said shaft serving as said tape capstan portion.

2. Capstan drive means as claimed in claim 1, in which said shaft also projects above said rotor at its juncture therewith for rotational support thereat.

3. Capstan drive means as claimed in claim 1, in which said shaft also projects above said rotor at its juncture therewith for rotational support thereat to constitute a vertical rotational support for said shaft and rotor in conjunction with the opposite extended shaft end.

4. Capstan drive means as claimed in claim 1, in which said bearing means is within said sleeve, and in which said shaft also projects above said rotor at its juncture therewith for rotational support thereat.

References Cited

UNITED STATES PATENTS

| | | | |
|---|---|---|---|
| 2,624,856 | 1/1953 | Younger | 310—74 |
| 2,953,700 | 9/1960 | Roters | 310—261 |
| 3,022,433 | 2/1962 | Ferranti | 310—74 |
| 3,136,467 | 6/1964 | Olson | 226—188 X |
| 3,147,901 | 9/1964 | Nordman | 226—194 X |
| 3,326,440 | 6/1967 | Barnes | 226—188 |

RICHARD A. SCHACHER, Primary Examiner

U.S. Cl. X.R.

226—194; 310—74